United States Patent
Um et al.

(10) Patent No.: US 9,804,307 B2
(45) Date of Patent: Oct. 31, 2017

(54) MULTILAYER OPTICAL FILM, METHOD OF PRODUCING THE SAME AND POLARIZER COMPRISING THE SAME

(71) Applicant: LG Chem, LTD., Seoul (KR)

(72) Inventors: Jun-Geun Um, Daejeon (KR); Nam-Jeong Lee, Daejeon (KR); Sang-Min Kwak, Daejeon (KR); Suk-Il Youn, Daejeon (KR); Sei-Jung Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 559 days.

(21) Appl. No.: 14/385,643

(22) PCT Filed: Jun. 17, 2014

(86) PCT No.: PCT/KR2014/005288
§ 371 (c)(1),
(2) Date: Sep. 16, 2014

(87) PCT Pub. No.: WO2014/204168
PCT Pub. Date: Dec. 24, 2014

(65) Prior Publication Data
US 2016/0054490 A1 Feb. 25, 2016

(30) Foreign Application Priority Data

Jun. 18, 2013 (KR) ........................ 10-2013-0069629
Jun. 16, 2014 (KR) ........................ 10-2014-0072860

(51) Int. Cl.
| | | |
|---|---|---|
| *G02B 5/20* | (2006.01) | |
| *G02B 5/30* | (2006.01) | |
| *G02B 5/22* | (2006.01) | |
| *B29D 11/00* | (2006.01) | |
| *B32B 27/08* | (2006.01) | |
| *B32B 27/30* | (2006.01) | |
| *G02B 1/14* | (2015.01) | |

(Continued)

(52) U.S. Cl.
CPC .......... *G02B 5/208* (2013.01); *B29D 11/0073* (2013.01); *B29D 11/00644* (2013.01);
(Continued)

(58) Field of Classification Search
None
See application file for complete search history.

(56) References Cited

U.S. PATENT DOCUMENTS

2005/0249944 A1* 11/2005 Wang ..................... G02B 1/105
428/339
2005/0249962 A1* 11/2005 Chen ...................... G02B 1/105
428/480

(Continued)

FOREIGN PATENT DOCUMENTS

CN        101568861 A       10/2009
JP        2004-070296 A      3/2004

(Continued)

OTHER PUBLICATIONS

Machine_English_translation_JP_2012082358_A; Furo, T.; Optical Film; Apr. 26, 2012; JPO; whole document.*

Primary Examiner — Tahseen N Khan
(74) Attorney, Agent, or Firm — Dentons US LLP

(57) ABSTRACT

The present disclosure relates to a multilayer optical film including a first film layer formed of a thermoplastic acrylic resin composition including 0.01 to 2.0 parts by weight of a triazine-based ultraviolet absorber; a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber; and a third film layer formed of the thermoplastic acrylic resin composition including 0.01 to 2.0 parts by weight of the triazine-based ultraviolet absorber, with respect to 100 parts by weight of the thermoplastic acrylic resin composition, a method of manufacturing the same, and a polarizing plate including the same.

17 Claims, 1 Drawing Sheet

(51) Int. Cl.
   *B29K 33/00* (2006.01)
   *B29K 105/00* (2006.01)
(52) U.S. Cl.
   CPC ............ *B32B 27/08* (2013.01); *B32B 27/308* (2013.01); *G02B 1/14* (2015.01); *G02B 5/3033* (2013.01); *B29K 2033/12* (2013.01); *B29K 2105/0085* (2013.01); *B32B 2250/03* (2013.01); *B32B 2307/306* (2013.01); *B32B 2307/402* (2013.01); *B32B 2307/412* (2013.01); *B32B 2307/42* (2013.01); *B32B 2457/20* (2013.01); *B32B 2551/00* (2013.01); *G02B 5/223* (2013.01); *G02B 5/305* (2013.01)

(56) References Cited

U.S. PATENT DOCUMENTS

2009/0257003 A1* 10/2009 Yoshihara .............. G02B 1/105
   349/96
2010/0033810 A1* 2/2010 Haida .................... B32B 27/08
   359/361
2010/0047484 A1 2/2010 Kitagishi et al.
2011/0159257 A1 6/2011 Kim et al.
2012/0308812 A1* 12/2012 Shibuya ............... C09D 133/08
   428/336

FOREIGN PATENT DOCUMENTS

| JP | 2004163684 A | 6/2004 |
| JP | 2004-224909 A | 8/2004 |
| JP | 2005-028837 A | 2/2005 |
| JP | 2008-181078 A | 8/2008 |
| JP | 2008181079 A | 8/2008 |
| JP | 2010121080 A | 6/2010 |
| JP | 2010-238917 A | 10/2010 |
| JP | 2011-137130 A | 7/2011 |
| JP | 2012082358 A * | 4/2012 |

* cited by examiner

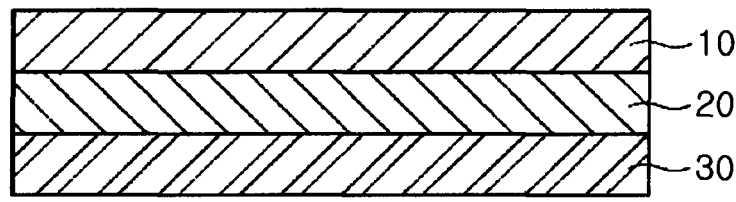

MULTILAYER OPTICAL FILM, METHOD OF PRODUCING THE SAME AND POLARIZER COMPRISING THE SAME

This application is a 35 USC §371 National Stage entry of International Application No. PCT/KR2014/005288, filed on Jun. 17, 2014, and claims priority of Korean Application Nos. KR 10-2013-0069629 filed Jun. 18, 2013 and KR 10-2014-0072860 filed Jun. 16, 2014, which are each hereby incorporated by reference in their entirety.

TECHNICAL FIELD

The present disclosure relates to a multilayer optical film, a method of manufacturing the same, and a polarizing plate including the same.

BACKGROUND ART

In line with the development of optical technologies in recent years, various technologies for display devices such as plasma display panels (PDPs), liquid crystal displays (LCDs), organic electroluminescent displays (OEDs) and the like, to replace cathode-ray tubes (CRT), have been suggested, and have become commercially available. Meanwhile, various polymer films such as polarizing films, polarizing protective films, retardation films, light guiding plates, and plastic substrates are being used in such display devices. Characteristics required for materials used in such display devices have tended to be further enhanced.

Meanwhile, in polarizing plates currently used in image display devices such as liquid crystal display devices, triacetyl cellulose films (hereinafter, referred to as TAC films) are commonly used as protective films for protecting polyvinyl alcohol polarizers. However, since the TAC film has insufficient moisture resistance and heat resistance properties, characteristics of the polarizing plates such as a degree of polarization or color properties may be deteriorated due to the deformation of the film in the case of uses thereof under conditions of high temperature and high humidity. Therefore, of late, a method of using a transparent acrylic resin film having superior moisture resistance and heat resistance properties as a material of a polarizer protective film, instead of the use of the TAC film, has been suggested.

In addition, a technology of adding an ultraviolet absorber to such an acrylic film to provide ultraviolet light absorbing functions, thereby preventing a polarizer from being deteriorated by ultraviolet light, has been proposed. In the case of an acrylic film according to the related art, it is known that a benzotriazole-based compound, a benzophenone-based compound, a benzotriazine-based compound, a cyano acrylate-based compound, a salicylic acid-based compound or the like may be used as the ultraviolet absorber.

However, since a majority of known ultraviolet absorbers may decompose during a high temperature processing operation, ultraviolet light absorbing capability may be deteriorated and further, a resin and a film may be yellowed due to pyrolysis of the ultraviolet absorbers.

In particular, since the benzotriazine-based compound may have a high degree of absorptivity in the ultraviolet B region (315 nm to 280 nm) but have a low degree of absorptivity in the ultraviolet A region (400 nm to 315 nm), an excessive amount of the benzotriazine-based compound needs to be added. However, when an excessive amount of the ultraviolet absorber is added as described above, in a case in which acrylic resin melted by receiving high temperature pressure by an extruder during a process of manufacturing an acrylic film is suddenly cooled down in a casting-rolling process after passing through a T-die, a migration phenomenon, a phenomenon in which the ultraviolet absorber may decompose and be discharged outside of the film to be stained on a casting roll, may be excessively generated. As a result, the pyrolyzed ultraviolet absorber may also be stained on the film, thereby causing defects in the exterior of the film.

Moreover, since ultraviolet absorbers well known in the art may have low degrees of molecular weight and low glass transition temperatures, in a case in which a large quantity of such ultraviolet absorbers are added, a glass transition temperature of a resin composition may be significantly lowered, such that heat resistance properties may be degraded or optical properties of an optical film may be negatively influenced thereby.

Thus, the development of technologies allowing for the manufacturing an optical film having superior ultraviolet light absorptivity and a high glass transition temperature (Tg) while not allowing the occurrence of coloring and contamination, has been requested.

DISCLOSURE

Technical Problem

An aspect of the present disclosure provides a multilayer optical film having superior heat resistance properties and excellent ultraviolet light absorptivity, while allowing for high economic feasibility, a method of manufacturing the same, and a polarizing plate including the same.

Technical Solution

According to an aspect of the present disclosure, there is provided a multilayer optical film including a first film layer formed of a thermoplastic acrylic resin composition including 0.01 to 2.0 parts by weight of a triazine-based ultraviolet absorber; a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber; and a third film layer formed of the thermoplastic acrylic resin composition including 0.01 to 2.0 parts by weight of the triazine-based ultraviolet absorber, with respect to 100 parts by weight of the thermoplastic acrylic resin composition.

According to another aspect of the present disclosure, there is provided a method of manufacturing a multilayer optical film, the method including: co-extruding a first film layer formed of a thermoplastic acrylic resin composition including 0.01 to 2.0 parts by weight of a triazine-based ultraviolet absorber, a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber, and a third film layer formed of the thermoplastic acrylic resin composition including 0.01 to 2.0 parts by weight of the triazine-based ultraviolet absorber, with respect to 100 parts by weight of the thermoplastic acrylic resin composition, and stretching the co-extruded film.

According to another aspect of the present disclosure, there is provided a polarizing plate including: a polarizer; a protective film provided on at least one surface of the polarizer, wherein the protective film is the multilayer optical film as described above.

Advantageous Effects

A multilayer optical film according to an exemplary embodiment of the present disclosure may have superior heat resistance properties and excellent ultraviolet light absorptivity, while allowing for high economic feasibility.

Further, in a method of manufacturing a multilayer optical film according to an exemplary embodiment of the present disclosure, a process of preparing a film and a process of stretching the film may be configured in a continuous manner to thereby allow for improvements in productivity and the manufacturing of an optical film having a desired degree of ultraviolet light transmittance may be facilitated without a separate additional process to thereby allow for high economic feasibility. The consequently manufactured optical film may have significantly high degrees of mechanical strength and impact strength.

In addition, a polarizing plate according to an exemplary embodiment of the present disclosure may include a polarizer and a protective film provided on at least one surface of the polarizer and in this case, the protective film may be a multilayer optical film including a first film layer, a second film layer and a third film layer and durability thereof may be excellent.

DESCRIPTION OF DRAWINGS

FIG. 1 is a view illustrating an implementation example of a multilayer optical film according to an exemplary embodiment of the present disclosure.

BEST MODE

Hereinafter, exemplary embodiments of the present disclosure will be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

As a result of repeated research in order to develop an optical film having high ultraviolet light blocking effects, superior transparency and color and heat resistance properties, high degrees of ultraviolet light absorptivity, and excellent economic feasibility, the inventors of the disclosure come to develop a multilayer optical film according to an exemplary embodiment of the present disclosure.

In other words, the inventors of the present disclosure completed a multilayer optical film having a high degree of ultraviolet light absorptivity while having high economic feasibility and thermal stability according to an exemplary embodiment of the present disclosure by manufacturing an optical film in multiple layers and selectively using types and ingredients of ultraviolet (UV) absorbers in respective film layers.

An exemplary embodiment of the present disclosure may provide a multilayer optical film including a first film layer formed of a thermoplastic acrylic resin composition including 0.01 to 2.0 parts by weight of a triazine-based ultraviolet absorber; a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber; and a third film layer formed of the thermoplastic acrylic resin composition including 0.01 to 2.0 parts by weight of the triazine-based ultraviolet absorber, with respect to 100 parts by weight of the thermoplastic acrylic resin composition.

FIG. 1 discloses an implementation example of a multilayer optical film according to an exemplary embodiment of the present disclosure. As illustrated in FIG. 1, the multilayer optical film according to an exemplary embodiment of the present disclosure may have a multilayer structure of a first film layer 10, a second film layer 20, and a third film layer 30. The optical film having such a multilayer structure may be advantageous in that it may be manufactured by differentiating constitutions of respective film layers. That is, the first film layer and the third film layer may include the triazine-based ultraviolet absorber having excellent heat resistance properties and the second film layer may include at least one ultraviolet absorber selected from the group consisting of a triazole-based ultraviolet absorber, a benzophenone-based ultraviolet absorber, an oxanilide-based ultraviolet absorber and a cyanoacrylate-based ultraviolet absorber, that have superior ultraviolet light absorptivity, whereby an optical film having superior heat resistance properties as well as excellent ultraviolet light absorptivity may be manufactured. In particular, even in a case in which a small amount of a very expensive triazine-based ultraviolet absorber is used in a partial layer of the multilayer optical film as described above, since an optical film having superior heat resistance properties may be obtained, a manufacturing cost of the optical film may be reduced to allow for significant economic advantages.

Meanwhile, in the thermoplastic acrylic resin composition forming the first film layer and the third film layer, the triazine-based ultraviolet absorber may be included in an amount of 0.01 to 2.0 parts by weight with respect to 100 parts by weight of the thermoplastic acrylic resin composition. When the content of the triazine-based ultraviolet absorber included in the first film layer and the third film layer satisfies the numerical range, in a case in which acrylic resin melted by receiving high temperature pressure by an extruder during a process of manufacturing an acrylic film is suddenly cooled down in a casting-roll process after passing through a T-die, since a migration phenomenon, a phenomenon in which the ultraviolet absorber may decompose and be discharged outside of the film to be stained on a casting roll, may not occur, the acting of the ultraviolet absorber as a pollutant of the film may be prevented. Consequently, a multilayer optical film having excellent exterior characteristics simultaneously with superior ultraviolet light absorptivity may be obtained. In addition, even in a case in which a small amount of a very expensive triazine-based ultraviolet absorber is added to the multilayer optical film as described above, since an optical film having superior heat resistance properties may be obtained, a manufacturing cost of the optical film may be reduced to allow for improvements in productivity.

Further, in the thermoplastic acrylic resin composition forming the second film layer, the at least one ultraviolet absorber selected from the group consisting of the triazole-based ultraviolet absorber, the benzophenone-based ultraviolet absorber, the oxanilide-based ultraviolet absorber and the cyanoacrylate-based ultraviolet absorber may be included in an amount of 0.1 to 5.0 parts by weight with respect to 100 parts by weight of the thermoplastic acrylic resin composition. When the content of the ultraviolet absorber included in the second film layer satisfies the numerical range, since a drastic decrease in a glass transition temperature of the resin composition may be prevented, the multilayer optical film according to an exemplary embodiment of the present disclosure may be considerably excellent in terms of heat resistance properties and ultraviolet light absorptivity.

In particular, in an exemplary embodiment of the present disclosure, in a case in which the content of the ultraviolet absorber included in the first film layer and the third film layer exceeds the numerical range and an excessive amount of the ultraviolet absorber is added, or in a case in which the content of the ultraviolet absorber included in the second film layer exceeds the numerical range and an excessive amount of the ultraviolet absorber is added, a difference in melt viscosities of the thermoplastic acrylic resin compositions respectively forming the first film layer and the second film layer or a difference in melt viscosities of the thermoplastic acrylic resin compositions respectively forming the third film layer and the second film layer may be considerably generated and in this case, a wave pattern may be formed in respective interfaces of the multilayer optical film to thereby deteriorate exterior characteristics of the film.

Meanwhile, in the multilayer optical film according to an exemplary embodiment of the present disclosure, a material of the triazine-based ultraviolet absorber included in the first film layer and the third film layer is not particularly limited, as long as ultraviolet light absorptivity thereof may be 10% to 80% at a wavelength range of 280 nm to 400 nm. For example, the triazine-based ultraviolet absorber may be at least one selected from a group consisting of a benzotriazine-based compound containing a hydroxyl group and a benzotriazine-based compound containing at least one organic residue group having 1 to 20 carbon atoms. As described above, in a case in which the benzotriazine-based compound contains a hydroxyl group or at least one organic residue group having 1 to 20 carbon atoms, since a maximum absorption wavelength λmax of the triazine-based ultraviolet absorber may be shifted to a long wavelength region adjacent to a wavelength band of 380 nm, the case may be considerably advantageous in terms of significantly decreasing the content of the ultraviolet absorber included in the films.

In particular, the triazine-based ultraviolet absorber included in the thermoplastic acrylic resin composition forming the first film layer and the third film layer may have a weight average molecular weight of 300 to 2,000. When the weight average molecular weight of the triazine-based ultraviolet absorber satisfies the numerical range, compatibility of the ultraviolet absorber with respect to the thermoplastic acrylic resin composition may be excellent and consequently formed first and third film layers may have superior mechanical or thermal properties.

Meanwhile, in the multilayer optical film according to an exemplary embodiment of the present disclosure, in the case that a thickness of the optical film is 60 μm, the first film layer and the third film layer may have a straight light transmittance of 10% to 30% at a wavelength of 380 nm. A wavelength region of 380 nm is known as the UVA region. Here, since light of the wavelength region may not be absorbed in an ozone layer and intensity thereof may also be significantly high, light of the wavelength region necessarily needs to be blocked. Therefore, in a case in which the straight light transmittance of the first film layer and the third film layer satisfies the numerical range under the above conditions, an optical film having superior ultraviolet light absorptivity, in particular, ultraviolet light absorptivity in the UVA region, may be obtained.

Further, in the case that the thickness of the optical film is 60 μm, the first film layer and the third film layer may have a straight light transmittance of 3% to 12% at a wavelength of 290 nm. A wavelength region of 290 nm is known as the UVB region. Here, since a majority of light in the wavelength region may be absorbed in an ozone layer but light energy in the wavelength region may be strong due to a short wavelength, light of the wavelength region needs to be blocked even in a case in which a small amount of light arrives at the top of the ground. Therefore, in a case in which the straight light transmittance of the first film layer and the third film layer satisfies the numerical range under the above conditions, an optical film having superior ultraviolet light absorptivity, in particular, ultraviolet light absorptivity in the UVB region, may be obtained.

In the multilayer optical film according to an exemplary embodiment of the present disclosure, a material of the ultraviolet absorber included in the second film layer is not particularly limited, as long as ultraviolet light absorptivity thereof may be 10% to 80% at a wavelength range of 280 nm to 400 nm. For example, the ultraviolet absorber included in the second film layer may be at least one selected from a group consisting of a triazole-based ultraviolet absorber, a benzophenone-based ultraviolet absorber, an oxanilide-based ultraviolet absorber and a cyanoacrylate-based ultraviolet absorber. In particular, in an exemplary embodiment of the present disclosure, in a case in which the ultraviolet absorber included in the second film layer is at least one selected from a group consisting of a triazole-based compound containing a hydroxyl group, an acrylonitrile group, and an chlorine element, a triazole-based compound containing at least one organic residue group having 1 to 20 carbon atoms, and the like, the case may be more preferable in that ultraviolet light absorptivity of the optical film may be improved, in other words, an optical film having desired ultraviolet light absorptivity while containing a significantly decreased amount of the ultraviolet absorber may be obtained.

In addition, the ultraviolet absorber included in the thermoplastic acrylic resin composition forming the second film layer may have a weight average molecular weight of 100 to 1,000 or 200 to 800. When the weight average molecular weight of the ultraviolet absorber included in the second film layer satisfies the numerical range, thermal stability of the ultraviolet absorber may be excellent and thus, thermal stability of the resin composition may be superior. Moreover, in the case, an amount of the ultraviolet absorber added to the second film layer may be easily controlled due to a high boiling point thereof, and the consequently formed second film layer may have superior mechanical or thermal properties.

Meanwhile, in the multilayer optical film according to an exemplary embodiment of the present disclosure, in the case that the thickness of the optical film is 60 μm, the second film layer may have a straight light transmittance of 1% to 15% at a wavelength of 380 nm. In a case in which the straight light transmittance of the second film layer satisfies the numerical range under the above conditions, since denaturation in a polarizing element due to ultraviolet light, in particular, ultraviolet light in the UVA region, may be prevented, adverse effects on optical properties of a polarizer due to ultraviolet light in the UVA region may be prevented.

In addition, in the case that the thickness of the optical film is 60 μm, the second film layer may have a straight light transmittance of 0.1% to 7% at a wavelength of 290 nm. In a case in which the straight light transmittance of the second film layer satisfies the numerical range under the above conditions, since denaturation in a polarizing element due to ultraviolet light, in particular, ultraviolet light in the UVB region, may be prevented, adverse effects on optical properties of a polarizer due to ultraviolet light in the UVB region may be prevented.

Meanwhile, in the thermoplastic acrylic resin composition, a thermoplastic acrylic resin may include a copolymer including (a) an alkyl(meth)acrylate-based unit and (b) a styrene-based unit. In addition, the thermoplastic acrylic resin may further include an aromatic resin having a carbonate unit in a main chain thereof.

In an exemplary embodiment of the present disclosure, the alkyl(meth)acrylate-based unit may provide small amounts of a negative in-plane retardation (Rin) and a negative thickness-direction retardation (Rth) to the film, and the styrene-based unit may provide great amounts of the negative in-plane retardation (Rin) and the negative thickness-direction retardation (Rth) to the film during a stretching process. Meanwhile, the aromatic resin having a carbonate unit in a main chain thereof may provide positive in-plane retardation (Rin) characteristics and positive thickness-direction retardation (Rth) characteristics.

Here, the negative in-plane retardation means the highest in-plane refractive index in a direction perpendicular with respect to a stretching direction of the film, the positive in-plane retardation means the highest refractive index in the stretching direction, the negative thickness-direction retardation means that a refractive index in a thickness-direction is greater than an average refractive index in an in-plane direction, and the positive thickness-direction retardation means that the average refractive index in the in-plane direction is greater than the refractive index in the thickness-direction.

Due to characteristics of the respective units as described above, retardation characteristics of correspondingly manufactured optical films may be varied depending on compositions, stretching directions, stretching ratios and stretching methods of the respective components. Thus, in an exemplary embodiment of the present disclosure, a multilayer optical film able to be used as a zero (0) retardation film, that is, a protective film, may be manufactured by controlling compositions and stretching methods of the respective components.

Meanwhile, in the specification, the term copolymer means that elements referred to as 'units' in the specification are polymerized as monomers and are contained as repeating units in a copolymer resin. In the specification, the copolymer may be a block copolymer or a random copolymer, but a copolymer form is not limited thereto.

In addition, in the specification, the meaning of 'the alkyl(meth)acrylate based unit' includes both 'an alkyl acrylate based unit' and 'an alkyl methacrylate based unit' and is not limited to, but in consideration of optical transparency, compatibility, processability and productivity, an alkyl moiety of the alkyl(meth)acrylate based unit may have 1 to 10 carbon atoms, preferably may have 1 to 4 carbon atoms, more preferably, may be a methyl group or an ethyl group. More specifically, the alkyl(meth)acrylate based unit may be at least one selected from a group consisting of methyl methacrylate, ethyl methacrylate, isopropyl methacrylate, n-butyl methacrylate, t-butyl methacrylate, hydroxyethyl methacrylate, isobornyl methacrylate and cyclohexyl methacrylate, but is not limited thereto.

In this case, the alkyl(meth)acrylate based unit may be included in an amount of 70 to 98 parts by weight, preferably 82 to 97 parts by weight with respect to 100 parts by weight of the copolymer. When the amount satisfies the numerical range, an optical film having superior transmittance and heat resistance properties may be obtained and birefringence generated during stretching may be significantly reduced.

Next, in an exemplary embodiment of the present disclosure, (b) the styrene-based unit may improve polymerization efficiency between respective monomers, and since a film manufactured using the resin composition including the styrene-based unit may further easily control stretching retardation, a zero retardation film having excellent birefringence may be obtained.

In this case, (b) the styrene-based unit may be an unsubstituted styrene monomer or a substituted styrene monomer. The substituted styrene monomer may be styrene substituted with a substituent including aliphatic hydrocarbon or heteroatom in a benzene ring or a vinyl group. For example, the substituted styrene monomer may be at least one selected from a group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethyl styrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene and β-bromostyrene, but is not limited thereto. Preferably, styrene substituted with $C_{1-4}$ alkyl or halogen may be used. More specifically, the styrene-based monomer may be at least one selected from a group consisting of styrene, α-methylstyrene, p-bromostyrene, p-methylstyrene and p-chlorostyrene. More preferably, the styrene-based monomer may be at least one selected from a group consisting of styrene, α-methylstyrene and p-methylstyrene.

The content of the styrene monomer may be, preferably 0.1 to 10 parts by weight, more preferably 0.5 to 5 parts by weight with respect to 100 parts by weight of the copolymer. When the content satisfies the numerical range, stretching retardation of the film may be easily controlled and more preferable optical characteristics of the film may be obtained.

Meanwhile, in an exemplary embodiment of the present disclosure, the aromatic resin having the carbonate unit in the main chain thereof may include 5 to 10,000 units represented by the following [Chemical Formula I]:

[Chemical Formula I]

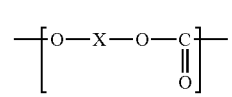

where, X is a divalent group containing at least one benzene ring, more preferably, a divalent group selected from groups consisting of the following structural formulae.

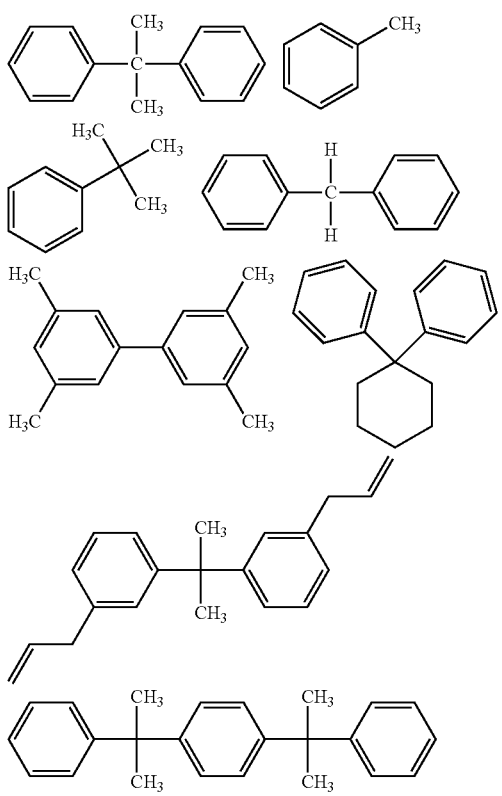

Meanwhile, the aromatic resin having the carbonate unit in the main chain thereof may be added to control retardation and be included in an amount of approximately 0.1 to 10 parts by weight, preferably approximately 1 to 5 parts by weight, with respect to 100 parts by weight of the total thermoplastic acrylic resin composition. When the aromatic resin having the carbonate unit in the main chain thereof is included in an amount below the range, the thickness-direction retardation of a stretched film may be increased in a positive direction. When the aromatic resin having the carbonate unit in the main chain thereof is included in an amount exceeding the range, the thickness-direction retardation of the stretched film may be increased in a negative direction. Further, when the content of the aromatic resin exceeds 10 parts by weight, compatibility thereof with respect to the thermoplastic acrylic resin composition may be degraded to cause a whitening event. Thus, when the content of the aromatic resin having the carbonate unit in the main chain satisfies the numerical range, the aromatic resin may be added by controlling the content thereof such that an absolute value of in-plane retardation ($R_{in}$) defined by the following [Formula 1] and an absolute value of thickness-direction retardation ($R_{th}$) defined by the following [Formula 2] are respectively 5 nm, preferably 3 nm, more preferably 0.

$$R_{in} = (n_x - n_y) \times d,  \quad \text{[Formula 1]}$$

$$R_{th} = (n_x - n_y) \times d \quad \text{[Formula 2]}$$

where $n_x$ is the largest in-plane refractive index of the optical film, $n_y$ is an in-plane refractive index of the optical film in a direction perpendicular to the direction of $n_x$, $n_z$ is a thickness refractive index of the film, and d is a thickness of the film.

In this case, the resin composition including the copolymer resin and the aromatic resin having the carbonate unit in the main chain thereof may be manufactured by a method commonly known in the technical field such as a compounding method.

Further, in consideration of the fact that the copolymer including (a) the alkyl(meth)acrylate-based unit and (b) the styrene-based unit may provide superior heat resistance properties to a film manufactured using the copolymer, the copolymer may further include: (c) a 3 to 6-membered hetero ring unit substituted with at least one carbonyl group. The hetero ring unit may be selected from a group consisting of maleic anhydride, maleimide, glutaric anhydride, glutarimide, lactone and lactam. In addition, in a case in which (c) the 3 to 6-membered hetero ring unit substituted with at least one carbonyl group and (a) the alkyl(meth)acrylate-based unit configure the copolymer, compatibility between the copolymer resin and the aromatic resin having the carbonate unit in the main chain thereof may be increased.

Meanwhile, more particularly, (c) the 3 to 6-membered hetero ring unit substituted with at least one carbonyl group may be, for example, maleimide derivatives such as ethyl maleimide, n-butyl maleimide, t-butyl maleimide, cyclohexyl maleimide, phenyl maleimide and the like. In particular, (c) the 3 to 6-membered hetero ring unit substituted with at least one carbonyl group may be a phenyl maleimide unit. Since the phenyl maleimide unit may have regular chemical monomer structures due to effects of a phenyl group substituted therein, such that the formation of a copolymer together with (a) the alkyl(meth)acrylate-based unit and (b) the styrene-based unit may be facilitated, heat resistance properties may be improved and time required for polymerization may be relatively short.

Meanwhile, a concrete example of the phenyl maleimide unit may be at least one selected from a group consisting of phenylmaleimide, nitro-phenyl maleimide, mono-chlorophenyl maleimide, dichloro-phenyl maleimide, mono-methylphenyl maleimide, dimethylphenyl maleimide, and ethyl methylphenyl maleimide.

In this case, (c) the 3 to 6-membered hetero ring unit substituted with at least one carbonyl group may be included in an amount of 0.1 to 10 parts by weight with respect to 100 parts by weight of the copolymer resin. When the content of the 3 to 6-membered hetero ring unit substituted with at least one carbonyl group satisfies the numerical range, heat resistance properties of the optical film may be excellent and resin characteristics may be brittle, thereby preventing a correspondingly manufactured optical film from being fragile.

Meanwhile, in an exemplary embodiment of the present disclosure, the thermoplastic acrylic copolymer may further include an alkyl acrylate-based unit in order to impart polymerization stability and thermal stability to the resin composition and to impart toughness to a stretched film. Due to the introduction of such a structural unit, a degree of formability such as releasability or the like may be improved and a weight reduction caused by heat during a process may be prevented, such that a composition having superior heat resistance properties may be obtained.

In this case, an alkyl moiety of the alkyl acrylate-based unit may be a cycloalkyl group or a substituted alkyl group and may have approximately 1 to 10 carbon atoms, preferably approximately 1 to 6 carbon atoms. More preferably, an alkyl moiety of the alkyl acrylate-based unit may be a methyl group or an ethyl group. Specifically, the alkyl acrylate-based unit may be methyl acrylate, ethyl acrylate, isopropyl acrylate, n-butyl acrylate, t-butyl acrylate, cyclohexyl acrylate, isobornyl acrylate, hydroxymethyl acrylate or hydroxyethyl acrylate, but is not limited thereto.

The alkyl acrylate-based unit may be included in an amount of 0.1 to 5 parts by weight, preferably 0.5 to 3.0 parts by weight, with respect to 100 parts by weight of the thermoplastic acrylic copolymer. When the content of the alkyl acrylate-based unit satisfies the range, it may be very advantageous in that polymerization between (a) the alkyl (meth)acrylate-based unit and (c) the 3 to 6-membered hetero ring unit substituted with at least one carbonyl group may be facilitated during the formation of the copolymer, a pyrolysis phenomenon that may be caused in a resin melting process may be overcome, and toughness may be imparted to a film at the time of stretching the film to facilitate a stretching process.

Meanwhile, in a case in which a glass transition temperature of the thermoplastic acrylic resin used in an exemplary embodiment of the present disclosure is 70° C. or more, the thermoplastic acrylic resin may be very suitably used. In order to further suppress moisture absorption of pellets, a glass transition temperature of the thermoplastic acrylic resin may preferably be 110° C. or more, for example, 115° C. or more, 120° C. or more, or 125° C. or more. As the glass transition temperature of the thermoplastic acrylic resin is increased, since the fusion initiation temperature of pellets may be increased, the pellets may be manufactured at a further increased temperature. Consequently, thermoplastic acrylic resin pellets having a low amount of contained water may be manufactured.

Then, shapes of the ultraviolet (UV) absorbers are not particularly limited. For example, the ultraviolet (UV) absorber may have a power form, a granular form, a flake form or a liquid form.

In the multilayer optical film according to an exemplary embodiment of the present disclosure, a difference between glass transition temperatures of films configuring the respective film layers may be 2° C. or less. When the difference between glass transition temperatures of films configuring the respective film layers satisfies the numerical range, the occurring of bending and curling in the multilayer optical film due to a difference in coefficients of expansion may be prevented.

In the multilayer optical film according to an exemplary embodiment of the present disclosure, an ultraviolet light transmittance may range from 0.1% to 10% at a wavelength of 380 nm. When the ultraviolet light transmittance satisfies the numerical range at a wavelength of 380 nm, it denotes that superior ultraviolet light absorptivity may be exhibited in a visible light region of 400 nm to 800 nm, in particular, in the vicinity of a wavelength band of 400 nm. Thus, a reduction in light transmissivity in the vicinity of a wavelength band of 400 nm may be prevented and durability of a polarizing plate using the multilayer optical film may be improved. In connection with this, in a case in which a degree of the ultraviolet light transmittance is increased in the vicinity of a wavelength band of 400 nm, in other words, in a case in which a degree of the light transmissivity is decreased, a relatively red light may be further remarkable and a yellowing phenomenon in which a film is yellowed may occur, such that changes in the color of a polarizing plate and denaturation in a polarizing element may be generated.

The multilayer optical film according to an exemplary embodiment of the present disclosure may be formed by co-extruding the first film layer, the second film layer and the third film layer. In a case in which the multilayer optical film is manufactured by the co-extrusion process as described above, an optical film having desired ultraviolet light absorptivity may be manufactured without a separate additional process, and thicknesses of the respective layers and contents of the ultraviolet absorbers may be easily adjusted.

In the multilayer optical film according to an exemplary embodiment of the present disclosure, in the case that a thickness of the optical film is 60 μm, a straight light transmittance at a wavelength of 550 nm may be 80% or more, more particularly, 85% to 100%. When a straight light transmittance measured at a wavelength of 550 nm in the case that the thickness of the multilayer optical film is 60 μm satisfies the numerical range, transmittancy of a polarizing plate may be increased to allow for excellent visibility, color changes may be prevented, and a contrast ratio (CR) may be reduced to allow for superior definition in liquid crystal panels.

Further, in the multilayer optical film, in the case that the thickness of the optical film is 60 μm, a straight light transmittance at a wavelength of 380 nm may be 0.1% to 15%, more particularly, 0.1% to 10%. When a straight light transmittance measured at a wavelength of 380 nm in the case that the thickness of the multilayer optical film is 60 μm satisfies the numerical range, ultraviolet light absorptivity, in particular, ultraviolet light absorptivity in the UVA region, may be excellent. Thus, in a case in which the optical film as described above is applied to a polarizing plate, denaturation in a polarizing element due to ultraviolet light in the UVA region may be prevented.

Furthermore, in the multilayer optical film, in the case that the thickness of the optical film is 60 μm, a straight light transmittance at a wavelength of 290 nm may be 0.01% to 5%, more particularly, 0.01% to 4%. When a straight light transmittance measured at a wavelength of 290 nm in the case that the thickness of the multilayer optical film is 60 μm satisfies the numerical range, ultraviolet light absorptivity, in particular, ultraviolet light absorptivity in the UVB region, may be excellent. Thus, in a case in which the optical film as described above is applied to a polarizing plate, denaturation in a polarizing element due to ultraviolet light in the UVB region, may be prevented.

In the multilayer optical film according to an exemplary embodiment of the present disclosure, ingredients of the ultraviolet absorbers included in the first film layer and the third film layer are identical and an ingredient of the ultraviolet absorber included in the second film layer is different from those included in the first film layer and the third film layer. The ingredients of the ultraviolet absorbers may be selectively used in the respective film layers, whereby ultraviolet light absorptivity may be excellent and high economic feasibility and thermal stability may be exhibited.

Next, a method of manufacturing the multilayer optical film according to an exemplary embodiment of the present disclosure will be described.

In an exemplary embodiment of the present disclosure, a method of manufacturing the multilayer optical film may include co-extruding the first film layer, the second film layer, and the third film layer as described above; and stretching the co-extruded film.

In the method of manufacturing the multilayer optical film according to an exemplary embodiment of the present disclosure, the co-extrusion process of the first film layer, the second film layer, and the third film layer may be provided to obtain a multilayer optical film through a continuous process, and may be performed by co-extruding the layers. More specifically, the co-extrusion process may be performed by, for example, a co-extruding T-die method, a co-extruding inflation method, a co-extruding lamination method, or the like, but the present disclosure is not limited thereto.

In particular, the co-extrusion process of the first film layer, the second film layer, and the third film layer may be performed by the co-extruding T-die method. For example, the thermoplastic acrylic resin composition forming the second film layer may be extruded by a first biaxial extruder having a diameter of 32Φ and an L/D of 40, and the thermoplastic acrylic resin composition forming the first film layer and the third film layer may be extruded by a second uniaxial extruder having a diameter of 30Φ and an L/D of 28. Resins respectively melted in the first extruder and the second extruder may meet in a feed block unit after the extruders to form respective melt flow layers and then, be formed as a multilayer film through a T-die. Here, the L/D refers to a value obtained by dividing the overall length of a screw by a diameter of the screw.

Meanwhile, an extrusion temperature at the time of performing the co-extrusion process may be suitably selected such that the resin has a melt viscosity suitable for melt extrusion film formation. All extrusion temperatures of the first film layer, the second film layer and the third film layer may be 220° C. to 290° C. or 240° C. to 280° C. In addition, in the multilayer optical film, a difference in extrusion temperatures of the first film layer and the second film layer or a difference in extrusion temperatures of the third film layer and the second film layer may be 30° C. or less or 20° C. or less, in order to suppress melt viscosities of resins from being excessively changed to cause a deterioration in formability due to temperature changes when the resins in the respective film layers come into contact with each other in the T-die or in the feed block unit.

In addition, the melt viscosities of the thermoplastic acrylic resin compositions forming the first film layer, the second film layer, and the third film layer may be 200 Pa·s to 900 Pa·s under conditions of a melting temperature of 265° C. and a shear rate of 100 1/s. In this case, a difference in melt viscosities of the thermoplastic acrylic resin compositions forming the first film layer and the second film layer or a difference in melt viscosities of the thermoplastic acrylic resin compositions forming the third film layer and the second film layer may be 300 Pa·s or less, preferably 50 Pa·s to 200 Pa·s in order to secure formability, in particular, uniform thicknesses of the respective layers. When the differences in viscosities of the melt resins configuring the respective film layers exceed 300 Pa·s, a wave pattern may be formed in interfaces between the respective film layers due to a difference in shear rates to thereby deteriorate exterior characteristics of the film.

The thermoplastic acrylic resin used in the multilayer optical film according to an exemplary embodiment of the present disclosure may obtain sufficient adhesion strength in a state in which the first film layer, the second film layer, and the third film layer directly contact each other due to heat fusion caused by co-extrusion. In addition, even after stretching processing, good adhesion properties between the first film layer, the second film layer, and the third film layer may be maintained.

Meanwhile, in the method of manufacturing the multi-layer optical film, all film layers are not limited to being manufactured by a co-extrusion method and for example, the first film layer or the third film layer may be formed by coating and curing methods.

Next, the stretching of the co-extruded film will be described.

In the method of manufacturing the optical film according to an exemplary embodiment of the present disclosure, in the stretching of the co-extruded film, a stretching process may be undertaken such that stretching in a machine direction (MD) and stretching in a transverse direction (TD) may be separately performed, or the both may be performed together. When the machine direction (MD) stretching and the transverse direction (TD) stretching are performed, either of the machine direction (MD) stretching and the transverse direction (TD) stretching may first be performed and then the stretching in the other direction may be performed. Alternatively, the machine direction (MD) stretching and the transverse direction (TD) stretching may be simultaneously performed. Stretching may be performed in a single stage or in multiple stages. In the case of the machine direction (MD) stretching, the stretching may be performed according to a difference between the speeds of rollers, and in the case of the transverse direction (TD) stretching, a tenter may be used. A rail initiation angle of the tenter is generally within 10 degrees to restrain a bowing phenomenon occurring in the event of transverse direction (TD) stretching, and to control the angle of an optical axis regularly. The bowing restraining effect may be obtained by performing transverse direction (TD) stretching in multiple stages. Through such a stretching process, retardation characteristics of the film may be controlled.

In the method of manufacturing the optical film according to an exemplary embodiment of the present disclosure, in the stretching of the co-extruded film, a stretching ratio may be 1.3 times to 3.5 times, 1.5 times to 3.0 times, or 1.7 times to 2.7 times in the machine direction (MD). When the stretching ratio in the machine direction (MD) satisfies the numerical range, handleability of the film may be excellent and breakages of the stretched film may be prevented. Meanwhile, in the specification, the machine direction (MD) refers to a direction in which the film proceeds.

Further, in the stretching of the co-extruded film, a stretching ratio may be 1.3 times to 3.5 times, 1.5 times to 3.0 times, or 1.7 times to 2.7 times in the transverse direction (TD). When the stretching ratio in the transverse direction (TD) satisfies the numerical range, handleability of the film may be excellent and breakages of the stretched film may be prevented. Meanwhile, in the specification, the machine direction (MD) refers to a direction in which the film proceeds. Meanwhile, in the specification, the transverse direction (TD) refers to a direction perpendicular with respect to the direction in which the film proceeds.

Meanwhile, in the stretching process during the method of manufacturing the optical film according to an exemplary embodiment of the present disclosure, a stretching temperature may preferably be determined based on glass transition temperatures of films forming the respective film layers of the multilayer optical film, in terms of adjusting retardation. Specifically, the stretching temperature may be within a range of the highest glass transition temperature of the respective film layers included in the multilayer optical film+30° C. or less or +20° C. or less. When the stretching temperature satisfies the numerical range, mechanical properties of the optical film may be excellent and film breakage during the stretching process may be prevented.

In this case, all of glass transition temperatures of films forming the respective film layers of the multilayer optical film may be 110° C. or more, in particular, 110° C. to 180° C. or 120° C. to 150° C., in order to secure thermal stability and stretchability.

According to the method of manufacturing the optical film according to an exemplary embodiment of the present disclosure, since a process of preparing a film and a process of stretching the film may be configured in a continuous manner, productivity may be improved and the manufacturing of an optical film having a desired degree of ultraviolet light transmittance may be facilitated without a separate additional process to thereby allow for high economic feasibility. Further, the consequently manufactured optical film may have significantly high degrees of mechanical strength and impact strength.

According to an exemplary embodiment of the present disclosure, there is provided a polarizing plate including a polarizer and a protective film provided on at least one surface of the polarizer, wherein the protective film is the multilayer optical film formed of the first film layer, the second film layer and the third film layer.

The multilayer optical film according to an exemplary embodiment of the present disclosure may be used as a polarizer protective film. In this case, a surface of the multilayer optical film may be modified in order to improve adhesion properties. The modifying methods may include a method of treating a surface of the protective film through a corona treatment, a plasma treatment, an UV treatment or the like, a method of forming a primer layer on the surface of the protective film, and the like. The two methods may be simultaneously used. Types of primer materials are not particularly limited, but the use of a compound having a reactive functional group such as a silane coupling agent may be preferable.

The polarizing plate including the multilayer optical film according to an exemplary embodiment of the present disclosure as a protective film, may include a polarizer and a protective film provided on at least one surface of the polarizer, wherein the protective film may be the multilayer optical film as described above.

Meanwhile, in the polarizing plate according to an exemplary embodiment of the present disclosure, any polarizer may be used without limitation, as long as it is known in the technical field. For example, a film formed of polyvinyl alcohol (PVA) containing iodine or dichromatic dyes may be used as the polarizer. The polarizer may be manufactured by dyeing a PVA film with iodine or dichromatic dyes, but a manufacturing method thereof is not particularly limited thereto. In the specification, the polarizer refers to a state in which the protective film is not included and the polarizing plate refers to a state in which the polarizer and the protective films are included.

Adhesion between the polarizer and the protective film may be performed using an adhesive layer. Types of adhesive usable at the time of laminating the protective film and the polarizer are not particularly limited, as long as they are known in the technical field. For example, an one-component or two-component polyvinyl alcohol (PVA) adhesive, a polyurethane adhesive, an epoxy adhesive, a styrene butadiene rubber (SBR) adhesive, a hot melt adhesive or the like may be used.

Further, adhesion between the polarizer and the protective film may be performed in such a manner that the adhesive is first coated on a surface of the polarizer protective film or a surface of the PVA film serving as the polarizer using a roll coater, a gravure coater, a bar coater, a knife coater, a capillary coater or the like, and then the protective film and the polarizer are heat-pressed or pressed at room temperature using a laminated roll before the adhesive is completely dried, thereby being laminated. In the case of using the hot melt adhesive, a heat-pressing roll needs to be used.

Further, a bonding agent may be used, as long as a sufficient degree of bonding strength is exhibited thereby. An amount of a bonding agent sufficient to allow for a curing operation due to heat or ultraviolet light being irradiated thereto after the lamination to thereby improve mechanical strength of the bonding agent to a degree of an adhesive may be preferable. Further, the bonding agent may preferably have a degree of bonding strength at which interfacial adhesion is high, such that delamination may not occur without the breakage of either of two films to which the bonding agent is attached.

In particular, concrete examples of the usable bonding agent may include bonding agents having superior optical transparency such as natural rubber, synthetic rubber or elastomers, vinyl chloride/vinyl acetate copolymers, polyvinyl alkyl ether, polyacrylate, modified polyolefin-based bonding agents, and the like, and curable bonding agents in which a curing agent such as isocyanate or the like is added to the bonding agents as described above.

The polarizing plate according to an exemplary embodiment of the present disclosure manufactured as above may be used for various uses. Specifically, the polarizing plate may preferably be used in image display devices including polarizing plates for liquid crystal displays (LCDs) and reflection-preventing polarizing plates for organic electroluminescent (EL) displays. In addition, the polarizing plate according to an exemplary embodiment of the present disclosure may be applied to various functional films, for example, a complex polarizing plate manufactured by a combination of various optical layers including a retardation plate such as a λ/4 plate, a λ/2 plate or the like, a light diffusion plate, a viewing angle expanding plate, a brightness enhancement plate, and a reflector plate.

A bonding layer may be provided on at least one surface of the polarizing plate in order to facilitate application of the polarizing plate to an image display device or the like. In addition, to protect the bonding layer until the polarizing plate is applied to an image display device or the like, a releasing film may be further provided on the bonding layer.

The polarizing plate according to an exemplary embodiment of the present disclosure may include a polarizer and a protective film provided on at least one surface of the polarizer, wherein the protective film may be the multilayer optical film including the first film layer, the second film layer, and the third film layer, and durability thereof may be excellent.

MODE FOR DISCLOSURE

Manufacturing Example 1

(1) Manufacturing of Resin Composition 1000 g of a monomer mixture configured of 92 parts by weight of methyl methacrylate, 5 parts by weight of N-phenylmaleimide, 2 parts by weight of α-methyl styrene and 1 part by weight of methacrylate was prepared and mixed with 2000 g of distilled water, 8.4 g of 5% polyvinyl alcohol solution (POVAL PVA217, By Kuraray), 0.1 g of boric acid, 2.5 g of normal octyl mercaptan and 1.5 g of 2,2'-azobisisobutyronitrile in a 5-liter reactor and subsequently, was dispersed in a water phase while being agitated at a rate of 400 rpm.

Next, a primary polymerization was undertaken at 80° C. and the occurrence of a polymerization peak was confirmed after 60 minutes subsequent to the reaching of a suspension to 80° C. The temperature was raised to 115° C. and a secondary polymerization was undertaken for about 40 minutes. After the secondary polymerization as described above was undertaken, the suspension was cooled to 30° C., such that a resin composition having polymerized particles was obtained. The resin composition was washed with distilled water and dehydrated and then, was subjected to a drying process to be used.

In this case, the resin composition was shown to have spherical particles having an average diameter of 250 μm, as a result of confirmation using an optical microscope (LV100P, Nikon).

(2) Manufacturing of Raw Material Pellets

Subsequently, after 100 parts by weight of the resin composition was mixed with 1 part by weight of a triazine-based UV absorber (Tinuvin-1577, by BASF) in a solid mixer for 2 minutes, the raw material mixture was supplied to a second extruder of 24Φ, having nitrogen substituted from a raw material hopper to the extruder and was melted at a temperature of 260° C., such that raw material pellets were manufactured.

In this case, a glass transition temperature (Tg) of the manufactured resin was measured under temperature rising conditions of 10° C./min, using DSC (DSC823, by Mettler Toledo).

Manufacturing Example 2

A resin composition was manufactured using the same composition and method as those of Manufacturing Example 1.

Then, raw material pellets were manufactured using the resin composition by the same method as that of Manufacturing Example 1, with the exception that 3 parts by weight of a triazole-based UV absorber (Tinuvin-326, by BASF) based on 100 parts by weight of the resin composition, was used.

Manufacturing Example 3

A resin composition was manufactured using the same composition and method as those of Manufacturing Example 1.

Then, raw material pellets were manufactured using the resin composition by the same method as that of Manufacturing Example 1, with the exception that an UV absorber was not used.

Manufacturing Example 4

A resin composition was manufactured using the same composition and method as those of Manufacturing Example 1.

Then, raw material pellets were manufactured using the resin composition by the same method as that of Manufacturing Example 1, with the exception that 2 parts by weight of the UV absorber based on 100 parts by weight of the resin composition, was used.

Manufacturing Example 5

A resin composition was manufactured using the same composition and method as those of Manufacturing Example 2.

Then, raw material pellets were manufactured using the resin composition by the same method as that of Manufacturing Example 2, with the exception that 6 parts by weight of the UV absorber based on 100 parts by weight of the resin composition, was used.

Manufacturing Example 6

A resin composition was manufactured by the same method as that of Manufacturing Example 1, with the exception that pellets of acrylonitrile and styrene copolymer resin (82TR, by LG Chem.) were used.

Then, raw material pellets were manufactured by the same method as that of Manufacturing Example 1, with the exception that 1 part by weight of a triazine-based UV absorber (Tinuvin-1577, by BASF) based on 100 parts by weight of the resin composition, was used.

Manufacturing Example 7

A resin composition was manufactured by the same method as that of Manufacturing Example 1, with the exception that pellets of polycarbonate resin (LUPOY, by LG Chem.) were used.

Then, raw material pellets were manufactured by the same method as that of Manufacturing Example 1, with the exception that 1 part by weight of a triazine-based UV absorber (Tinuvin-1577, by BASF) based on 100 parts by weight of the resin composition, was used.

Manufacturing Example 8

A resin composition was manufactured using the same composition and method as those of Manufacturing Example 1.

Then, raw material pellets were manufactured by the same method as that of Manufacturing Example 1, with the exception that 1 part by weight of a triazine-based UV absorber (Tinuvin-1577, by BASF) and 3 parts by weight of a triazole-based UV absorber (Tinuvin-326, by BASF) based on 100 parts by weight of the resin composition were mixed to be used.

Types, molecular weights, and contents of the UV absorbers added to the raw material pellets manufactured according to the Manufacturing Examples 1 to 8 are shown in the following [Table 1].

TABLE 1

| Classification | UV Absorber | Molecular Weight of UV Absorber | Content (wt %) of UV Absorber | Tg (° C.) |
| --- | --- | --- | --- | --- |
| Manufacturing Example 1 | Triazine-based | 425 | 1.0 | 125 |
| Manufacturing Example 2 | Triazole-based | 316 | 3.0 | 124 |
| Manufacturing Example 3 | — | — | — | 125 |
| Manufacturing Example 4 | Triazine-based | 425 | 2.0 | 123 |
| Manufacturing Example 5 | Triazole-based | 316 | 6.0 | 122 |
| Manufacturing Example 6 | Triazine-based | 425 | 1.0 | 116 |
| Manufacturing Example 7 | Triazine-based | 425 | 1.0 | 143 |
| Manufacturing Example 8 | Triazine-based and Triazole-based | Triazine-based: 425 Triazole-based: 316 | Triazine-based: 1.0 Triazole-based: 3.0 | 123 |

Inventive Example 1

The raw material pellets manufactured according to Manufacturing Example 1 were hot-air dried at 80° C. for 6 hours and were melted at 260° C. using a second extruder to form a first film layer and a third film layer. In addition, the raw material pellets manufactured according to Manufacturing Example 2 were hot-air dried at 80° C. for 6 hours and were melted at 265° C. using a first extruder to form a second film layer.

Then, the first film layer, the second film layer, and the third film layer passed through a coat-hanger T-die and were subjected to a chrome-plated casting roll process and a dry roll process to thereby manufacture an optical film having a thickness of 210 μm. In this case, the thickness of the manufactured film was measured using a contact type thickness measuring device (m-hite, TEAS, Swiss).

Subsequently, the film was stretched in both of a machine direction (MD) and a transverse direction (TD) at a stretching ratio of 100% with a speed of 200 mm/min under a temperature of 131° C. to 135° C., which is higher than glass transition temperatures (Tg) of the respective film layers by 10° C., using an experimental film stretching device to thereby manufacture a multilayer optical film having a thickness of 52 μm.

Comparative Example 1

A multilayer optical film having a thickness of 54 μm was manufactured by the same method as that of Inventive Example 1, with the exception that a first film layer and a third film layer were formed using the raw material pellets manufactured according to Manufacturing Example 2 and a second film layer was formed using the raw material pellets manufactured according to Manufacturing Example 1.

Comparative Example 2

A multilayer optical film having a thickness of 55 μm was manufactured by the same method as that of Inventive Example 1, with the exception that a first film layer and a third film layer were formed using the raw material pellets manufactured according to Manufacturing Example 1 and a second film layer was formed using the raw material pellets manufactured according to Manufacturing Example 3.

Comparative Example 3

A multilayer optical film having a thickness of 58 μm was manufactured by the same method as that of Inventive Example 1, with the exception that a first film layer and a third film layer were formed using the raw material pellets manufactured according to Manufacturing Example 1 and a second film layer was formed using the raw material pellets manufactured according to Manufacturing Example 5.

Comparative Example 4

A multilayer optical film having a thickness of 53 μm was manufactured by the same method as that of Inventive Example 1, with the exception that a first film layer and a third film layer were formed using the raw material pellets manufactured according to Manufacturing Example 2 and a second film layer was formed using the raw material pellets manufactured according to Manufacturing Example 3.

Comparative Example 5

A multilayer optical film having a thickness of 54 μm was manufactured by the same method as that of Inventive Example 1, with the exception that a first film layer and a third film layer were formed using the raw material pellets manufactured according to Manufacturing Example 2 and a second film layer was formed using the raw material pellets manufactured according to Manufacturing Example 4.

Comparative Example 6

A multilayer optical film having a thickness of 57 μm was manufactured by the same method as that of Inventive Example 1, with the exception that a first film layer and a third film layer were formed using the raw material pellets manufactured according to Manufacturing Example 4.

Comparative Example 7

A multilayer optical film having a thickness of 54 μm was manufactured by the same method as that of Inventive Example 1, with the exception that a first film layer and a third film layer were formed using the raw material pellets manufactured according to Manufacturing Example 6.

Comparative Example 8

A multilayer optical film having a thickness of 52 μm was manufactured by the same method as that of Inventive Example 1, with the exception that a first film layer and a third film layer were formed using the raw material pellets manufactured according to Manufacturing Example 7.

Comparative Example 9

A multilayer optical film having a thickness of 52 μm was manufactured by the same method as that of Inventive Example 1, with the exception that all of first to third film layers were formed using the raw material pellets manufactured according to Manufacturing Example 2.

Comparative Example 10

A single-layer optical film having a thickness of 51 μm was manufactured by the same method as that of Inventive Example 1, with the exception that the films were manufactured using the raw material pellets manufactured according to Manufacturing Example 8, through the first extruder.

<Measurement of Whether or not Roll Contamination Occurred>

Whether or not roll contamination occurred was measured during processes of manufacturing the multilayer optical films according to Inventive Example 1 and Comparative Examples 1 to 10, and measured results are shown in the following [Table 2]. Whether or not roll contamination occurred was measured by observing a casting roll surface after 1 hour elapsed, subsequent to the formation of the film, to visually confirm a degree of contamination due to the UV absorber. In this case, as for a degree of contamination in a casting roll, when the roll surface was visually observed, in a case in which a murky portion was present, it was indicated as "0", while in a case in which a clean state like a glass surface was maintained, it was indicated as "X".

<Measurement of Whether or not Exterior of Film was Defective>

Whether or not the exterior of the film was defective was determined during processes of manufacturing the multilayer optical films according to Inventive Example 1 and Comparative Examples 1 to 10, and measured results are shown in the following [Table 2]. Whether or not the exterior of the film was defective was measured by visually confirming the presence or absence of defects in the exteriors of the optical films that had passed through the casting roll. In a case in which wave pattern defects were present in respective layers of the formed films, it was indicated as "X", while in a case in which a clean state like a glass surface was maintained, it was indicated as "○".

<Measurement of Straight Light Transmittance of Optical Film>

With respect to the optical films manufactured according to Inventive Example 1 and Comparative Examples 1 to 10, straight light transmittance was measured and measured results are shown in the following [Table 2]. In this case, the straight light transmittance of the optical film was measured using an UV-Visible Spectrophotometer (U-3310, Hitachi, Japan) in a state in which an integrating sphere was not installed.

<Measurement of Impact Strength of Optical Film>

Impact strength values of the optical films manufactured according to Inventive Example 1 and Comparative Examples 1 to 10 were measured and measured results are shown in the following [Table 2]. In this case, the impact strength value was estimated by measuring a height at which the film was broken by dropping a metal ball having a predetermined weight, using a drop impact tester apparatus, calculating potential energy corresponding to the measured height, per unit volume of the film, and converting the calculated value into impact strength.

Meanwhile, in the case of the optical film according to Comparative Example 3, imbalanced melt viscosity occurred between the first and third film layers and the second film layer due to a great amount of UV absorber being contained in the second film layer. Consequently, wave patterns were observed in interfaces between the film layers. Further, in the case of the optical films according to Comparative Examples 7 and 8, since the first film layer and the third film layer are formed of resin compositions having glass transition temperatures significantly different from that of the second film layer, imbalanced melt viscosity occurred between the first and third film layers and the second film layer, in a similar manner to the case of the Comparative Example 3. Consequently, wave patterns were observed in interfaces between the film layers. Further, in the case of the single-layer optical film, similar to the case of Comparative Example 10, it could be confirmed that impact strength was significantly deteriorated.

While the present disclosure has been shown and described in connection with the embodiments, it will be apparent to those skilled in the art that modifications and variations can be made without departing from the scope of the invention as defined by the appended claims.

TABLE 1

| Classification | Thickness of Film (μm) | Whether or not roll contamination occurred | Exterior of Film | Straight light transmittance (%) 290 nm | Straight light transmittance (%) 380 nm | Impact Strength of Film (Unit: kPa) |
|---|---|---|---|---|---|---|
| Inventive Example 1 | 52 | X | ○ | 0.02 | 2.08 | 558 |
| Comparative Example 1 | 54 | ○ | ○ | 0.02 | 10.37 | 568 |
| Comparative Example 2 | 55 | X | ○ | 4.91 | 80.26 | 487 |
| Comparative Example 3 | 58 | X | X | 0 | 0.05 | 541 |
| Comparative Example 4 | 53 | ○ | ○ | 5.86 | 14.92 | 494 |
| Comparative Example 5 | 54 | ○ | ○ | 0 | 7.26 | 4878 |
| Comparative Example 6 | 57 | ○ | ○ | 0 | 1.74 | 506 |
| Comparative Example 7 | 54 | X | X | 0.03 | 2.47 | 420 |
| Comparative Example 8 | 52 | X | X | 0.02 | 2.31 | 1122 |
| Comparative Example 9 | 52 | ○ | ○ | 0.01 | 1.08 | 537 |
| Comparative Example 10 | 51 | ○ | X | 0.02 | 2.34 | 340 |

As can be seen in the [Table 2], in the case of Inventive Example 1, roll contamination did not occurred, the exterior of the film was excellent and the multilayer optical film having superior straight light transmittance and impact strength was obtained.

However, in the case of the optical films according to Comparative Example 1 and Comparative Examples to 6, roll contamination occurred and straight light transmittance was poor. In addition, in the case of the optical films according to Comparative Examples 2 to 4, it could be confirmed that straight light transmittance was remarkably poor.

REFERENCE NUMERALS

10: FIRST FILM LAYER
20: SECOND FILM LAYER
30: THIRD FILM LAYER

The invention claimed is:
1. A multilayer optical film comprising:
a first film layer formed of a thermoplastic acrylic resin composition including 0.01 to 2.0 parts by weight of a triazine-based ultraviolet absorber;
a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber; and a third film layer formed of the thermoplastic acrylic resin composition including 0.01 to 2.0 parts by weight of the triazine-based ultraviolet absorber, with respect to 100 parts by weight of the thermoplastic acrylic resin composition, wherein, in a case that a thickness of the multilayer optical film is 60 μm, the first film layer and the third film layer have a straight light transmittance of 3% to 12%, the second film layer has a straight light transmittance of 0.1% to 7%, and the multilayer optical film has a straight light transmittance of 0.01% to 5%, at a wavelength of 290 nm.

2. The multilayer optical film of claim 1, wherein the triazine-based ultraviolet absorber in the first film layer and the third film layer has a weight average molecular weight of 300 to 2,000.

3. The multilayer optical film of claim 1, wherein in a case that a thickness of the multilayer optical film is 60 μm, the first film layer and the third film layer have a straight light transmittance of 10% to 30% at a wavelength of 380 nm.

4. The multilayer optical film of claim 1, wherein the ultraviolet absorber in the second film layer has a weight average molecular weight of 100 to 1,000.

5. The multilayer optical film of claim 1, wherein in a case that a thickness of the multilayer optical film is 60 μm, the second film layer has a straight light transmittance of 1% to 15% at a wavelength of 380 nm.

6. The multilayer optical film of claim 1, wherein the multilayer optical film has an ultraviolet light transmittance of 0.1% to 10% at a wavelength of 380 nm.

7. The multilayer optical film of claim 1, wherein the multilayer optical film is formed by co-extruding the first film layer, the second film layer, and the third film layer.

8. The multilayer optical film of claim 1, wherein in a case that a thickness of the multilayer optical film is 60 μm, the multilayer optical film has a straight light transmittance of 85% to 100% at a wavelength of 550 nm.

9. The multilayer optical film of claim 1, wherein in a case that a thickness of the multilayer optical film is 60 μm, the multilayer optical film has a straight light transmittance of 0.1% to 15% at a wavelength of 380 nm.

10. The multilayer optical film of claim 1, wherein in the thermoplastic acrylic resin composition, a thermoplastic acrylic resin includes a copolymer including an alkyl(meth)acrylate-based unit and a styrene-based unit.

11. The multilayer optical film of claim 10, wherein in the thermoplastic acrylic resin composition, the thermoplastic acrylic resin further includes an aromatic resin having a carbonate unit in a main chain thereof.

12. The multilayer optical film of claim 10, wherein a difference between glass transition temperatures of the thermoplastic acrylic resin compositions configuring the respective film layers is 2° C. or less.

13. A polarizing plate comprising:
a polarizer;
a protective film provided on at least one surface of the polarizer,
wherein the protective film is the multilayer optical film of claim 1.

14. A method of manufacturing a multilayer optical film, the method comprising:
co-extruding a first film layer formed of a thermoplastic acrylic resin composition including 0.01 to 2.0 parts by weight of a triazine-based ultraviolet absorber, a second film layer formed of a thermoplastic acrylic resin composition including 0.1 to 5.0 parts by weight of at least one ultraviolet absorber selected from a group consisting of a triazole-based ultraviolet absorber, a benzophenone-based ultraviolet absorber, an oxanilide-based ultraviolet absorber and a cyanoacrylate-based ultraviolet absorber, and a third film layer formed of the thermoplastic acrylic resin composition including 0.01 to 2.0 parts by weight of the triazine-based ultraviolet absorber, with respect to 100 parts by weight of the thermoplastic acrylic resin composition, and
stretching the co-extruded film,
wherein in a case that a thickness of the multilayer optical film is 60 μm, the first film layer and the third film layer have a straight light transmittance of 3% to 12%, the second film layer has a straight light transmittance of 0.1% to 7%, and the multilayer optical film has a straight light transmittance of 0.01% to 5%, at a wavelength of 290 nm.

15. The method of claim 14, wherein in the stretching of the co-extruded film, the co-extruded film is stretched at a stretching ratio of 1.3 times to 3.5 times in a machine direction (MD).

16. The method of claim 14, wherein in the stretching of the co-extruded film, the co-extruded film is stretched at a stretching ratio of 1.3 times to 3.5 times in a transverse direction (TD).

17. The method of claim 14, wherein in the stretching of the co-extruded film, the stretching is performed within a temperature range of the highest glass transition temperature of the respective film layers included in the multilayer optical film+30° C. or less.

* * * * *